United States Patent [19]
Salvati et al.

[11] 3,792,315
[45] Feb. 12, 1974

[54] METAL ENCLOSED SWITCHGEAR WITH SANDWICHED LOAD BLOCK SUPPORTS

[75] Inventors: John G. Salvati; Louis N. Ricci, both of Beaver Falls; Dominic Colista, Ambridge, all of Pa.

[73] Assignee: Westinghouse Electric Corporation, Pittsburgh, Pa.

[22] Filed: Mar. 1, 1973

[21] Appl. No.: 337,244

[52] U.S. Cl............. 317/112, 174/70 B, 339/198 N
[51] Int. Cl. ............................................... H02b 1/04
[58] Field of Search ..... 317/99, 112, 117, 118, 120; 339/198 N; 174/70 B, 71 B, 72 B

[56] References Cited
UNITED STATES PATENTS
3,566,194  2/1971  Gryctko............................ 317/117
3,349,291  10/1967  Olashaw............................ 317/120

Primary Examiner—Robert K. Schaefer
Assistant Examiner—Gerald P. Tolin
Attorney, Agent, or Firm—H. G. Massung

[57] ABSTRACT

Each section of a three-phase metal enclosed switchgear unit or assembly is provided with main through horizontal bus conductors and vertical risers or section bus. The front portion of each switchgear section is divided into a plurality of stacked enclosures in which single or dual circuit breakers can be mounted. A sandwiched load side support assembly using two identical load block supports is provided for positioning and bracing load side connectors extending from dual mounted circuit breakers.

6 Claims, 11 Drawing Figures

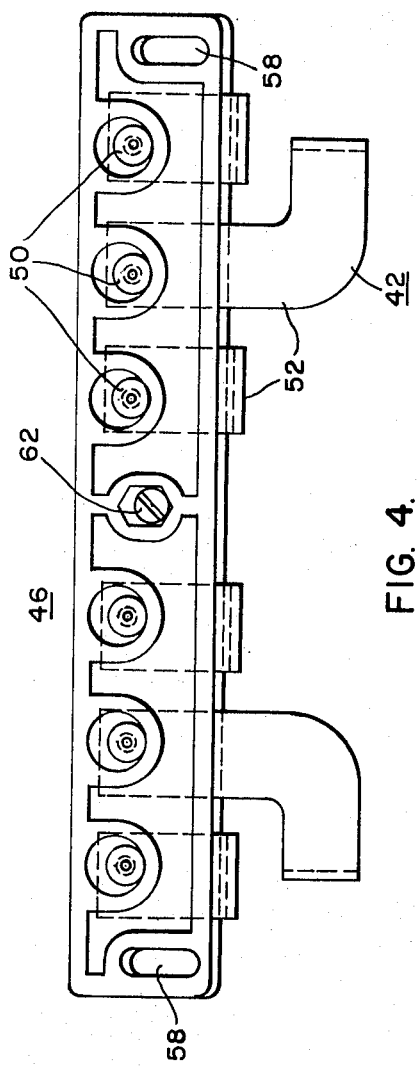
FIG. 4.
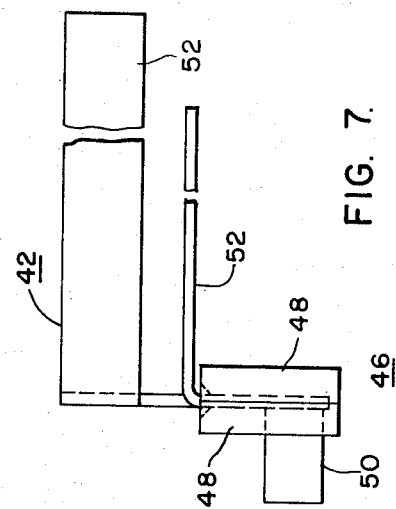
FIG. 7.
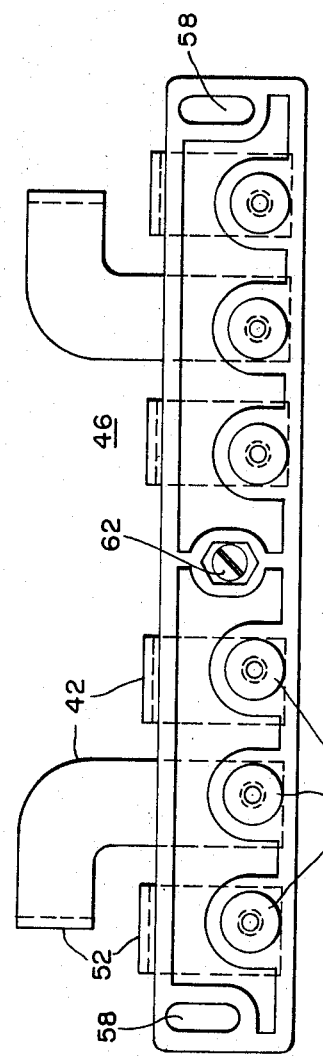
FIG. 6.
FIG. 5.

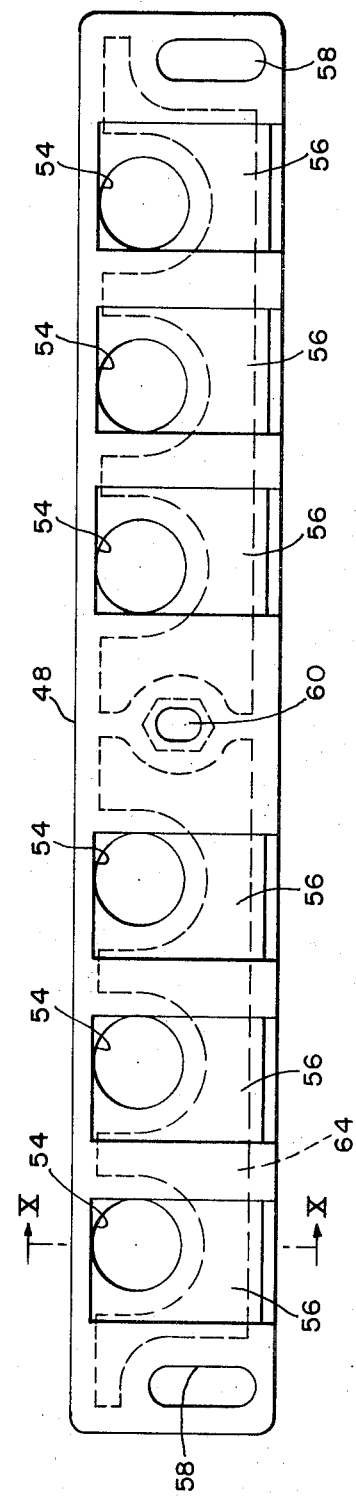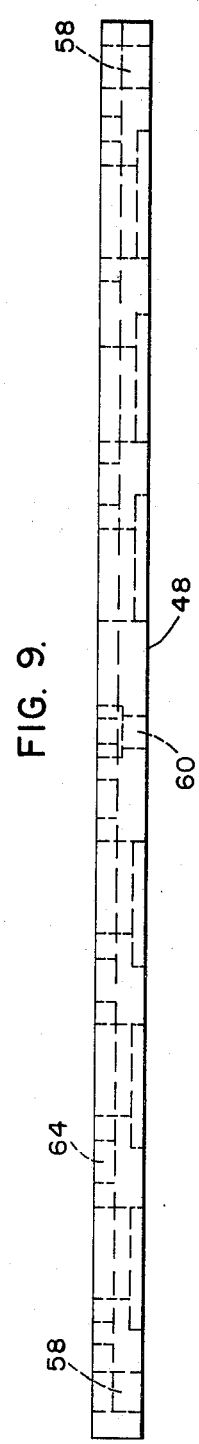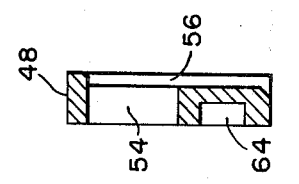
FIG. 8.
FIG. 9.
FIG. 10.

METAL ENCLOSED SWITCHGEAR WITH SANDWICHED LOAD BLOCK SUPPORTS

CROSS-REFERENCE TO RELATED APPLICATIONS

The subject matter of this invention is related to (Westinghouse Case No. 42,953) Application Ser. No. 324,263, filed 1/17/73 and (Westinghouse Case No. 42,954) Application Ser. No. 346,551, filed 3/3/73.

BACKGROUND OF THE INVENTION

This invention relates generally to switchgear and more particularly to metal enclosed switchgear of a type suitable for relatively low voltage power distribution service. More specifically, this invention relates to supports for the load side connectors from dual mounted molded case circuit breakers.

A metal enclosed switchgear installation usually includes one or more units with each unit or assembly consisting of a plurality of sections or cells. The sections are assembled side by side to provide a unit capable of housing a desired number of circuit breakers of other circuit controlling devices. The maximum of sections assembled in a unit at the factory is usually determined by the handling and shipping facilities available. Associated main through horizontal bus conductors and vertical riser conductors are electrically connected at one or more points. For economic reasons, it is desirable that the amount of through horizontal bus conductors, vertical section bus conductors, branch bus, load side extensions or connectors and interconnecting conductors be kept to a minimum. This can best be achieved by having a horizontal through bus conductor for each phase of a three-phase system, with the respective conductors spaced apart in a vertical plane behind the vertical section bus.

Each switchgear section comprises a structural framework and a formed sheet metal enclosure. Each switchgear unit generally has a breaker compartment at the front, a cable compartment at the rear and a bus or conductor compartment between the cable compartment and the breaker compartment. The breaker compartment can be divided into a plurality of individual enclosures for housing circuit breakers or other circuit controlling devices. Single or dual mounted molded case circuit breakers can be disposed in the individual enclosures.

The bus comparment contains main through bus bars and vertical riser conductors or vertical section bus to which the branch bus and individual circuit breakers are connected. Load side connectors extend from the single or dual mounted circuit breakers past the vertical section bus, through the bus compartment, and terminate in the cable compartment at the rear of the switchgear cell. Here, cables feeding branch circuit loads can easily be connected to the load side extensions. In order to keep the length of the load side extensions or connectors to a minimum, it is desirable that the depth of the bus compartment be kept as small as is practical. The cables which supply various loads or feed circuits with electrical power are connected to the load side conductors when the switchgear unit is installed in service.

With increased system capacity and higher available short circuit current, it is important that electrical conductors are constructred and positioned to withstand high magnetic forces. Under short circuit conditions where high fault currents produce electromagnetic forces of a large magnitude between conductors, it is essential that the through bus conductors, the section bus, and other conductors be so constrained as to withstand these forces.

For economic reasons, it is desirable that the number of parts used in constructing the metal enclosed switchgear be kept to a minimum. Since switchboards of this type house various size molded case circuit breakers, it is desirable that the load side support for dual mounted circuit breakers be capable of accepting and supporting the load side extensions of various size breakers. It is desirable that the load side support blocks accept these various size load side conductors without the necessity of providing additional parts, special drilling, or special mounting means to accommodate different ratings.

SUMMARY OF THE INVENTION

In accordance with the invention, a metal enclosed switchgear unit is provided with main through horizontal bus conductors and vertical section bus conductors.

The main through bus conductors comprise flat bus bars having their longitudinal axis extending in a horizontal direction with each phase being separated from the other phases by a vertical space. The phases of the horizontal through bus conductors are positioned in a spaced apart relationship with the bus bars width axes of all phases lying in a generally vertical plane. That is, the bus bars of each phase are positioned in an edge-to-edge spaced apart relationship with respect to the bus bars of the other phases. The vertical space between the edges of adjacent bus conductors is large enough to greatly reduce short circuit magnetic forces.

The vertical section bus conductors are disposed in front of the main through horizontal bus conductors a sufficient distance to maintain the required through air electrical clearance. The phases of the vertical bus conductors are separated also by sufficient distance to maintain the required phase-to-phase through air electrical clearance. Each vertical section bus is disposed in the switchgear unit with a front flat surface facing the front of the switchgear section, to which molded case circuit breakers can be easily attached. In the preferred embodiment, the switchgear section in front of the vertical risers is partitioned into a plurality of vertically stacked enclosures for housing single and dual mounted molded case circuit breakers. The flat surface on the vertical section bus, facing the front of the switchboard, provides an area to which circuit breakers and other circuit interrupting or controlling devices can easily be attached or connected. In connecting the molded case circuit breakers to the vertical section bus, suitable line side connectors coming off the circuit interrupter are bolted to the vertical section bus. When making bolted joints, some minimum contact area under pressure must be maintained in order to minimize heat generation and hot spots. Therefore, each of the flat surfaces to which the molded case circuit breakers are attached is a flat surface of minimum width, determined by possible heat rise, facing the front of the switchboard section. This flat surface has a maximum width restriction due to the space confines or limitations of the metal enclosed switchgear. Depth of the vertical section bus connection to the main through bus must be kept small because as the front surface of the vertical bus becomes further spaced from the main through horizontal bus conductors, all the breaker load side connectors, which extend past the vertical section bus into the cable compartment of the switchboard, increase in length. Load side electrically conducting connectors projecting away from the load side terminals of the circuit breaker and extending past the vertical section bus are supported by electrically insulating load block supports which are attached to the structural frame of the switchgear section.

For the smaller rated circuit breakers, a dual mounting is provided. That is, two molded case circuit breakers are mounted side-by-side in one of the vertically stacked enclosures. A pair of identical load block supports are provided, for dual mounted circuit breakers, for supporting the load side connectors. The pair of identical load block supports are fit or assembled together so as to sandwich a portion of the load side connector between them and thus position and support the load side connector. The load side connectors are formed by brazing a cylindrical electrical conductor to a member formed from an elongated rectangular bus bar. The elongated bus bars are bent so as to pass by the vertical section bus conductors when properly mounted in the switchgear section. The cylindrical portions of the load side connectors pass through openings in one of the load blocks and are connected to a molded case circuit breaker. The load side connectors are sized so as to carry the molded case circuit breaker rated current without undue temperature rise. That is, the load side connectors are constructed to have a temperature rise of not more than 50° C at the point of connection to the circuit breaker's load terminals. A portion of the load extensions are sandwiched between two load blocks as an assembly and are then mounted on or connected directly to steel channels of the switchboard framework. The cylindrical studs, that are brazed to the formed bus bars, protrude or project through openings in the molded block and serve as a mounting surface for attaching each connector to the load side terminals of the circuit breaker. The pair of load block supports are mounted in a face-to-face relationship sandwiching a portion of the load side connector between them, and supporting and positioning the cylindrical studs. When assembled the longitudinal axes of the load block supports are parallel. When supporting the largest size load side connectors, used with the highest rated dual mounted circuit breaker, the longitudinal axes of the load block supports are aligned in a front-to-back direction. Smaller size load side connectors, used with lower rated circuit breakers, can be supported by shifting one of the pair of load block supports so that the longitudinal axes are not aligned in a front-to-back direction. In supporting the smaller size load side connectors, the longitudinal axes of the load blocks are still maintained parallel but not aligned in a horizontal plane.

The load side connectors or extensions are held in place by the simple use of the two molded blocks. Load side extensions are simply pressed into the pockets of the molded blocks and the blocks are tightened around them. Once the sandwich extensions are mounted on or secured to the steel channels, and the breakers are connected, the extensions are held securely in place. The load side connectors, except where cable connections and attachment to the breaker are made, are coated with an insulating material such as vinyl or epoxy. The sandwich molded block assembly can have the individual molded blocks shifted slightly to accommodate various size extensions. Thus, one pair of molded blocks can accommodate the load side extensions for all sizes of dual mounted circuit breakers.

BRIEF DESCRIPTION OF THE DRAWINGS

For a better understanding of the invention, reference may be had to the preferred embodiment, exemplary of the invention shown in the accompanying drawings, in which:

FIG. 4 is an enlarged view of a portion of FIG. 3, showing the load block support assembly;

FIG. 5 is an end view of the load block support assembly shown in FIG. 4;

FIG. 6 is a front view of a load block support assembly similar to FIG. 4 but supporting larger load side connectors;

FIG. 7 is a side view of the load block assembly shown in FIG. 6;

FIG. 8 is a front view of a single load block support;

FIG. 9 is a top view of the load block support shown in FIG. 8; and

FIG. 10 is a section view of the load block support shown in FIG. 8 along the line X—X.

DESCRIPTION OF THE PREFERRED EMBODIMENT

Figure 1:
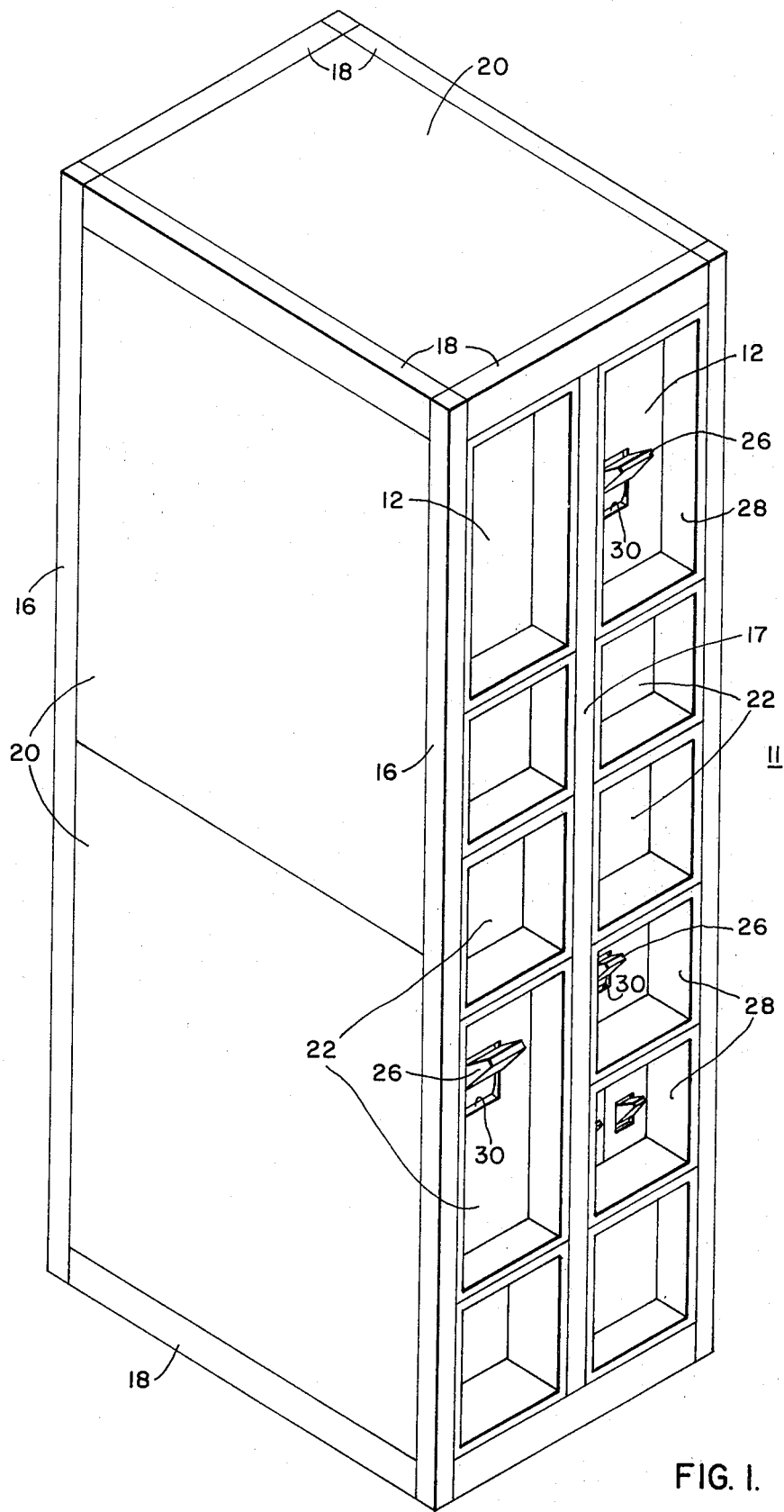
FIG. 1 is a perspective view of a double section switchgear unit or assembly.
Figure 2:
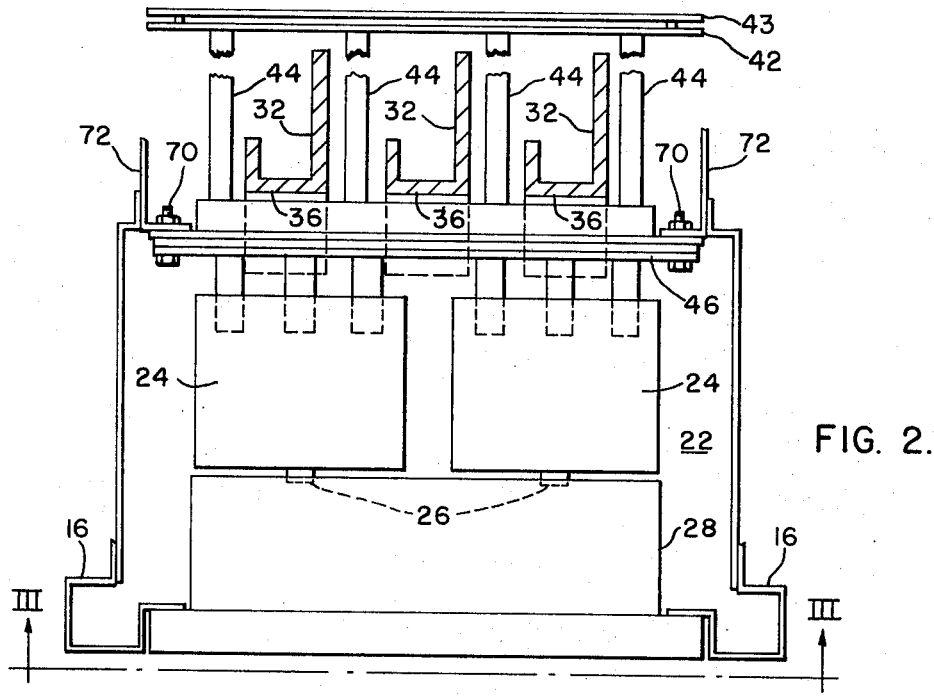
FIG. 2 is a top view of a portion of a dual mounted circuit breaker assembly utilizing the teaching of the present invention.

Referring now to the drawings, and to FIG. 1 in particular, there is shown a switchgear unit or assembly 11 comprising two generally rectangular upstanding sections or cells 12 disposed in side-by-side relationship. Additional cells may be added as desired. Generally each switchgear unit comprises structural members 16, 17 and 18 to which formed cover sheets 20 and front covers 28 are added or secured. The front portion of each switchgear section 12 is divided into a plurality of smaller vertically disposed enclosures 22 for various circuit breakers 24 and other circuit controlling apparatus. The enclosures 22 are vertically stacked or disposed one above the other up to the height of switchgear section 12. As shown in FIGS. 1 and 2, when the molded case circuit breakers 24 are mounted in the switchgear section 12, the front of the circuit breakers 24 are set back or spaced from the front of switchgear section 12. The operating handles 26 of the molded case circuit breakers 24 are also recessed or spaced from the front of the switchgear unit 11, as more fully described in copending application Ser. No. 346,551 filed 3/3/73 (Westinghouse Case No. 42,954). Covers 28 which attach to the vertical structural members 16 or 17 form a part of the front face of the switchgear 11. Switchgear unit 11 has a dead front construction with no energized parts accessible when the unit 11 is in service. Circuit breaker operating handles 26 project through openings 30 formed in the front covers 28. The breaker handles 26 are thus set back from the front of the switchgear unit 11 in a shallow well or cover 28 and are partially protected from material or personnel moving across the front of the switchboard unit 11.

Figure 2A:
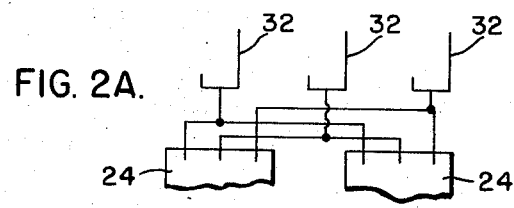
FIG. 2A is a schematic view of the line side connections of the dual mounted circuit breakers to the vertical bus.
Figure 3:
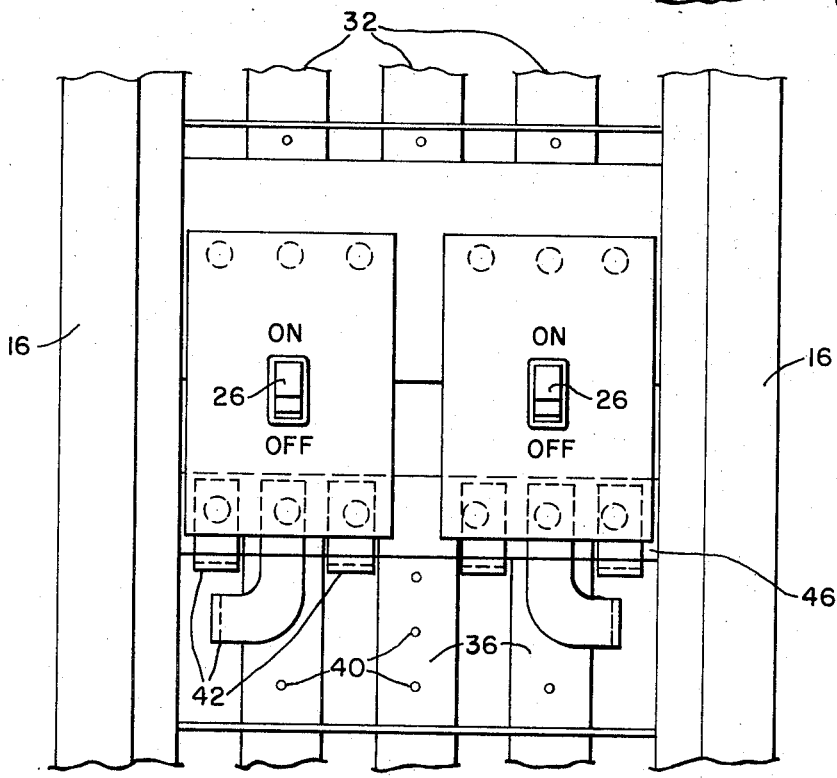
FIG. 3 is a front view of a portion of the switchgear assembly shown in FIG. 2 along the line III—III with the front cover panel removed for clarity.

As illustrated, each switchgear section 12 comprises three J-shaped vertical section bus members 32 as shown in FIGS. 2 and 3. The J-shaped section bus 32 has a flat surface 36 facing the front of switchboard section 12. A plurality of holes 40 are formed in the front flat surface 36 of the J-shaped section bus 32 to facilitate attachment of circuit breakers or other circuit controlling devices to the vertical bus 32. As shown schematically in FIG. 2A, each pole of a three-phase circuit breaker is connected to its associated phase of the J-shaped vertical bus. The multiple holes 40 are evenly spaced along the flat surface 36. Main through bus bars or conductors 42 extend horizontally in the switchgear 11. Additional bus bars 43 can be added to each phase of the horizontal through bus conductors 42 until the desired current rating is obtained. These additional bus bars for each phase of switchgear unit 11 may be added in a front-to-back spaced apart relationship. The longitudinal axis of the main through bus 42 is disposed in a generally horizontal direction, while the width axis of each phase of the main through bus lies generally in a common vertical plane. Vertical spaces separate three phases of the main through bus conductors 42. The ends of the main through bus conductors 12 have openings formed therein facilitating attachment to additional switchgear sections 12, when desired. A more detailed description of metal enclosed switchgear utilizing J-shaped vertical conductors is given in copending application Ser. No. 324263, filed 1/17/73, (Westinghouse Case No. 42,953).

As shown in FIGS. 1 to 3, some ratings of circuit breakers are of a small enough physical size so that two molded case circuit breakers 24 can be mounted side-by-side in one enclosure 22. These side-by-side or dual mounted circuit breakers 24 fit within a single enclosure 22 and are mounted so that their front surface is flush with cover 28. The back surface of cover 28 has two openings formed therein through which the dual mounted circuit breaker operating handles 26 can pass. Connectors 44 extend from the load terminals of dual mounted circuit breakers 24 past the vertical bus conductors 32 and terminate where cable connectors and cables can easily be attached.

The cross-sectional size of load side extensions 44 is determined by the full load rated current of the circuit breaker 24 to which load side connectors 42 are attached. Smaller connectors 44 are used for lower current rated breakers 24. The load side extensions are supported by a load block support assembly 46 as shown best in FIGS. 4 and 6. It is desirable that various sizes of load side extensions 44 can be supported by one load block assembly 46. This can be accomplished by having a load block assembly 46, as shown in FIGS. 4 to 6, which comprises a pair of molded electrically insulating support blocks, as shown in FIGS. 8 to 10.

Referring now to FIGS. 8 to 10, there is shown a single molded block support 48. Molded support block 48 is formed from an electrically insulating material, such as glass-polyester, epoxy, or the like. Load side extensions 44 are formed by attaching a cylindrical electrical conductor 50 to a formed elongated generally rectangular bus bar 52. A single load block support 48 as shown in FIG. 8 has a plurality, such as six openings 54 formed therein, through which the cylindrical portion 50 of each load side extension 44 can pass. Load block 48 also has a rectangular open recess or pocket 56 molded therein, for receiving a portion of bus bar 52. Slotted openings 58 are provided at both ends of load block 48 to facilitate fastening or securing said load block to the structural frame of switchgear unit 11. Another opening 60 is provided in the center of load block 48 so that when a pair of load blocks 48 are disposed face-to-face and a fastening means 62 passes through opening 60, blocks 48 can be held in the desired position to accommodate a given size of load side extensions 44. Other portions 64 of molded block 48 are hollowed out so as to reduce the amount of molded material required to produce or form block 48.

To support the load side extensions 44, a pair of load blocks 48 are assembled in a face-to-face relationship as shown in FIGS. 4 to 7. Referring now to FIGS. 4 and 5, there is shown an enlarged view of the load block assembly 46 shown in FIG. 3. Load blocks 48 are assembled in a face-to-face relationship with the generally cylindrical portion 50 of load side connector 44 passing through openings 54 in one of the load blocks 48. A portion of bus conductor 52 is then fit into a rectangular open pocket or recess 56 of both load block connectors 48. The load blocks 48 are then shifted somewhat so that the longitudinal axis of the back load block 48 is parallel to but lower than the longitudinal axis of the front load block 48. The load blocks 48 are shifted a sufficient distance so that the load side extensions 44 are held tightly. Fastening means 62 is then tightened and a rigid load block assembly 46 as shown in FIG. 4 is then ready for mounting in switchgear section 12. Bolts 70 can be used to rigidly fasten the load block assembly 46 to mounting channels 72, as shown in FIG. 2. When the load block assembly 46 is rigidly attached to the channels 72, cylindrical conductors 50 are firmly held in place for connecting to circuit breakers 24.

Referring now to FIGS. 6 and 7, there is shown a load block assembly 46 supporting larger load side conductors or connectors 44 than the assemblies shown in FIGS. 4 and 5. A pair of load blocks 48 are assembled in a face-to-face relationship with cylindrical connector 50 of load side extension 44 passing through one set of openings 54 in one of the load blocks 48. The load blocks 48 are assembled with openings 54 toward the bottom, and the open ends of molded pockets 56 opening upward. In this assembly, the diameter of cylindrical conductor 50 is approximately equal to the inner diameter of opening 54. In this arrangement as shown in FIGS. 6 and 7, the load side extensions 42 are held tightly in place when the pair of molded blocks 48 are assembled in a face-to-face relationship with the longitudinal axis parallel and aligned. When the load side extensions 44 are in place, fastening means 62 can be tightened to secure the load block assembly 46, and the assembly 46 as shown in FIG. 6 can be attached to the switchgear section 12. When the load side support assembly 46 is fastened to channel 72 by bolts passing through openings 58, the cylindrical portions 50 are held rigidly in place for engagement with or connection to the load side terminals of circuit breaker 24.

The load extensions 44 are sandwiched or disposed between two load blocks 48 and as part of an assembly 46, they are mounted on or secured directly to the steel channels 72 of the switchboard section 12. Cylindrical conductors 50 that are brazed or welded to rectangular formed bus bar extensions 52 protrude or project through one of the molded blocks 48 and serve as mounting surfaces for attaching or connecting the load side terminals or circuit breaker 24. Load side extensions 44 are held in place by the simple use of the two molded blocks 48. Blocks 48 are identical in construction and are used in pairs to form a sandwich about the load extensions 44. Load side extensions 44 are simply press fitted into the pockets or recesses 56 of the molded blocks 48. Once the sandwiched extensions 44 are mounted to the steel channel 72 and molded case circuit breakers 24 are attached or connected, extensions 44 are held securely in place. The load side extension support assembly of this invention provides a unique means of holding the extension bars in place. The load side assembly is formed from low cost and simply constructed molded blocks and requires little hardware to mount the extensions 44 plus the blocks 48 in place, in switchgear section 12.

What is claimed is:

1. A metal enclosed switchgear unit, comprising:
   a generally rectangular section structure;
   three horizontally extending main through bus bar conductors disposed horizontally in a spaced apart relationship in said rectangular section;
   three vertical risers disposed in said rectangular section in front of said main horizontal through bus bar conductors;
   connector means electrically connecting each phase of said horizontal main through bus bar conductors to its associated vertical riser;
   a plurality of enclosure means formed at the front of said section structure;
   a pair of circuit interrupters mounted in one of said enclosure means in a side-by-side relationship with each circuit interrupter being electrically connected to each of said vertical risers;
   a plurality of load side electrically conducting extensions extending from the load terminals of said pair of side-by-side circuit interrupters; and
   a load side extension support means for rigidly positioning said plurality of load side extensions, said load side extension support means comprising, a pair of support blocks, between which a portion of said load side extensions pass, being fastened together so as to engage and support said load side extensions.

2. A metal enclosed switchgear unit as claimed in claim 1 wherein: said load side extension support means comprises a pair of support blocks substantially identical in shape.

3. A metal enclosed switchgear unit as claimed in claim 2, wherein: said load side extension means comprise, a cylindrical conductor portion, and a generally elongated rectangular bus bar portion to which said cylindrical conductor portion is attached; each of said pair of support blocks having a generally rectangular pocket formed therein of a suitable size to receive a portion of said elongated rectangular bus bar; and said pair of load blocks disposed around and engaging a portion of said bus bar portion of each of said load side extensions.

4. A metal enclosed switchgear unit as claimed in claim 3 wherein each of said support blocks has a plurality of generally circular openings formed therethrough, and the cylindrical conductor portions of said load side extensions disposed to pass through the circular openings of one of said support blocks.

5. A metal enclosed switchgear unit as claimed in claim 2 wherein each of said support blocks has a slotted opening formed in each end thereof, to facilitate the securing of said blocks to said switchgear section.

6. A metal enclosed switchgear unit as claimed in claim 2, wherein: each of said support blocks has a slotted opening formed adjacent to the center thereof; said pair of support blocks being disposed so that a portion of the slotted openings in both of said support blocks overlap; and fastening means disposed through the slotted openings in both of said support blocks to hold said support blocks against relative movement.

* * * * *